F. BECHOFF.
LENS FOR INDICATING LAMPS.
APPLICATION FILED FEB. 2, 1918.
1,289,032.
Patented Dec. 24, 1918.
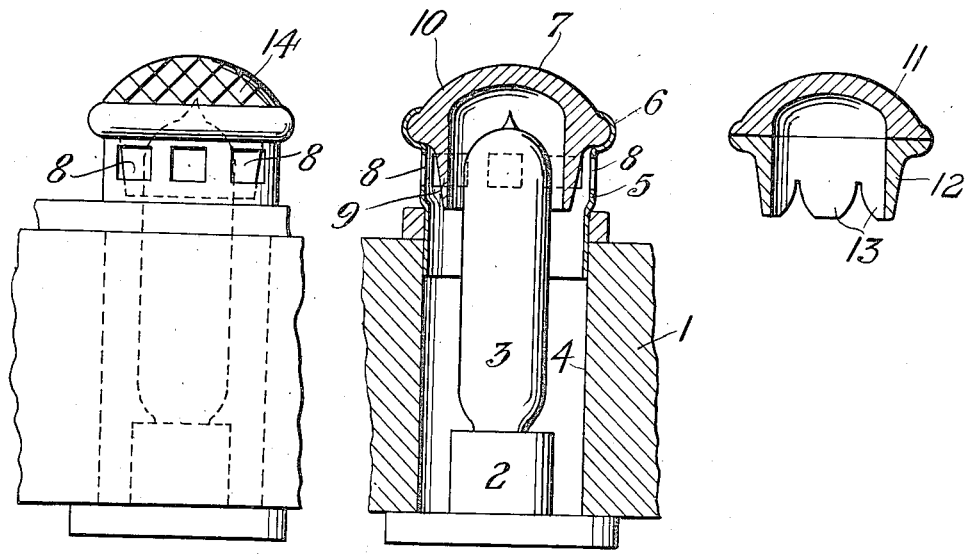
WITNESSES:
INVENTOR.
Ferdinand Bechoff.

UNITED STATES PATENT OFFICE.

FERDINAND BECHOFF, OF NEW YORK, N. Y.

LENS FOR INDICATING-LAMPS.

1,289,032.

Specification of Letters Patent. Patented Dec. 24, 1918.

Application filed February 2, 1918. Serial No. 215,135.

*To all whom it may concern:*

Be it known that I, FERDINAND BECHOFF, citizen of the United States, and resident of New York, in the county of New York and State of New York, have invented certain new and useful Improvements in Lenses for Indicating-Lamps, of which the following is a specification.

My invention relates to a lens employed as an adjunct to an electrical indicating lamp. These indicating lamps are mostly used in connection with a control switch and are mounted on a control panel. The control switch is intended to close momentarily electrical circuits for the operation of remote controlled solenoids or motors. The indicating lamps are connected in electrical circuits by opening or closing contacts on the remote controlled apparatus and their illumination indicates to the operator the actual condition of the same. For either the closed or the open position of these apparatus, as for instance circuit breakers, there is provided a separate indicating lamp, with transparent lenses, of distinguishing colors, mostly green or red. As these lenses have heretofore been constructed, their low visibility even from a near point has often given cause for errors by the operator, whereas with my device the color of the transparent lens can be easily distinguished even with unfavorable light inside the station.

In the accompanying drawing, Figure I is a central sectional view of a control panel having applied thereto an indicating lamp with lens embodying my invention; Fig. II is a side view of the lens holder showing the outer contours of the lens; Fig. III is another sectional view of a modification of the lens.

Referring to the drawing, the panel 1 has mounted on its back a receptacle 2 for the indicating lamp 3. The latter projects through a hole 4, which allows the removal of the lamp from the front of the panel 1. The same opening 4 serves also as a receptacle for cylinder 5 which terminates on its upper part in a claw 6. The latter holds the colored lens 7 in place and away from the top of the indicating lamp 3. This lens holder 5 is preferably made of copper sheet which allows the claw 6 to be spun around the corresponding semicircular projection of the lens 7. It also has provided on its outer circumference openings 8, through which air can freely pass and cool the lamp 3. The openings in the preferred form are rectangular to allow for a maximum of ventilation.

The lens 7 itself is a combination of two distinguished parts. The top part 10 with diamond shaped projections 14 on its outer surface is hollow so as to surround entirely the top of the indicating lamp 3 and allow the latter to extend beyond the front of the panel 1. The lower part 9 forms an extension of the top part 10 and acts like a cylindrical shield between that part of the indicating lamp which is opposite the openings 8 in the lens holder 5 and the openings themselves. (See Fig. I.) Since both parts 9 and 10 are made preferably of colored glass or other transparent material, light from the indicating lamp 3 must first pass through the transparent and colored tube 9 before it reaches the openings 8.

If now lamp 3 is lighted by being brought in electrical circuit through a contact on the remote operated device, the distinguishing color of the glass lens will be made visible not only on the top 10 of the lens but also through the windows 8.

It is evident that the color of this indicating lens 7 can be easily distinguished from any angle of observation which was not possible with the previously known devices of this character. Fig. III shows a modification of the glass lens by making the lens of two separate parts 11 and 12 to facilitate manufacturing and allowing for the use of various forms of the top part 11 without changing part 12. Teeth 13 are provided on part 12 to increase the radiating surface of the skirt 12, and improve the air circulation.

Having thus described my invention, I claim:

1. In an electrical indicating lamp, the combination of a lamp lighted by contacts on remote controlled apparatus, a lens holder with ventilating openings on its circumference and a transparent lens arranged to surround the top of said lamp and to extend beyond the openings in said lens holder.

2. An indicating lamp, a lens holder with ventilating holes and an indicating lens surrounding said lamp with a tubular shield of transparent material between the lamp and said ventilating openings.

3. An indicating lamp, a lens holder with ventilating openings and indicating lens with a hollow top part and a tubular shield with toothed projections opposite said ventilating openings.

Signed at New York in the county of New York and State of New York this 30th day of January A. D. 1918.

FERDINAND BECHOFF.

Witnesses:
CARLTON REIGER,
EULALIE SWIFT.